United States Patent
Frankowski

(10) Patent No.: US 9,869,379 B2
(45) Date of Patent: Jan. 16, 2018

(54) TENSIONER WITH INCREASED DAMPING AND ARM ON BASE CUP CONFIGURATION

(71) Applicant: Litens Automotive Partnership, Woodbridge (CA)

(72) Inventor: Marek Frankowski, Innisfil (CA)

(73) Assignee: LITENS AUTOMOTIVE PARTNERSHIP, Woodbridge, ON (CA)

( * ) Notice: Subject to any disclaimer, the term of this patent is extended or adjusted under 35 U.S.C. 154(b) by 0 days.

(21) Appl. No.: 14/917,743

(22) PCT Filed: Sep. 11, 2014

(86) PCT No.: PCT/CA2014/000689
§ 371 (c)(1),
(2) Date: Mar. 9, 2016

(87) PCT Pub. No.: WO2015/035508
PCT Pub. Date: Mar. 19, 2015

(65) Prior Publication Data
US 2016/0215859 A1    Jul. 28, 2016

Related U.S. Application Data

(60) Provisional application No. 61/876,502, filed on Sep. 11, 2013.

(51) Int. Cl.
*F16H 7/10* (2006.01)
*F16H 7/12* (2006.01)
(Continued)

(52) U.S. Cl.
CPC ......... *F16H 7/1218* (2013.01); *F16H 7/0831* (2013.01); *F02B 67/06* (2013.01); *F16H 2007/081* (2013.01); *F16H 2007/084* (2013.01)

(58) Field of Classification Search
CPC ............ F16H 2007/081; F16H 7/1218; F16H 2007/0872; F16H 7/1281; F16H 2007/0893
(Continued)

(56) References Cited

U.S. PATENT DOCUMENTS 1,667,117 A    4/1928  Ireland
2,002,081 A    5/1935  Dow
(Continued)

FOREIGN PATENT DOCUMENTS

CN    100540946 C    10/2004
CN    1959150 A    6/2006
(Continued)

OTHER PUBLICATIONS

Office Action for US14260282 dated Oct. 18, 2016.
(Continued)

*Primary Examiner* — Henry Liu
(74) *Attorney, Agent, or Firm* — Millman IP, Inc.

(57) ABSTRACT

In an aspect, a tensioner is provided for maintaining tension in an endless drive member in a belt-in-oil drive system. The tensioner includes a base that is mountable to a stationary structure and that has a circumferential wall that defines an arm pivot axis, an arm having a radially inner arm surface, and an endless drive member engagement surface that is engageable with an endless drive member, a bushing positioned between the radially inner arm surface and the circumferential wall of the base cup, and a tensioning spring. The arm is supported on the base cup via the bushing. The tensioning spring is positioned to bias the arm in a first direction about the arm pivot axis.

4 Claims, 7 Drawing Sheets

(51) Int. Cl.
*F16H 7/08* (2006.01)
*F02B 67/06* (2006.01)

(58) Field of Classification Search
USPC .................................................. 474/112, 135
See application file for complete search history.

(56) References Cited

U.S. PATENT DOCUMENTS

| | | | |
|---|---|---|---|
| 2,051,488 A | 8/1936 | Kottlowski et al. | |
| 2,054,023 A * | 9/1936 | McCann | B62M 1/00 474/111 |
| 2,196,255 A * | 4/1940 | Dow | F16H 7/129 474/112 |
| 2,210,276 A * | 8/1940 | Bremer | F16H 7/0848 474/110 |
| 3,426,606 A * | 2/1969 | Hopkins | F16H 7/0848 474/111 |
| 3,756,091 A | 9/1973 | Miller | |
| 3,811,332 A * | 5/1974 | Brown | F16H 7/08 474/111 |
| 3,838,606 A * | 10/1974 | Scalise | B62M 9/16 474/111 |
| 3,924,481 A | 12/1975 | Gregg | |
| 4,384,725 A | 5/1983 | Nenov | |
| 4,395,250 A * | 7/1983 | King | F16H 7/0848 474/111 |
| 4,515,577 A | 5/1985 | Cathey et al. | |
| 4,553,952 A | 11/1985 | Tangorra et al. | |
| 4,696,663 A * | 9/1987 | Thomey | F16H 7/1218 474/133 |
| 4,824,421 A * | 4/1989 | Komorowski | F16H 7/1218 474/112 |
| 4,921,472 A * | 5/1990 | Young | F16H 7/08 474/111 |
| 4,923,435 A * | 5/1990 | Kadota | F16H 7/1227 474/112 |
| 4,934,987 A * | 6/1990 | Kadota | F16H 7/1227 474/112 |
| 4,934,988 A * | 6/1990 | Kawamura | F16H 7/1218 474/117 |
| 5,030,171 A * | 7/1991 | Henderson | F16H 7/1218 474/135 |
| 5,078,656 A * | 1/1992 | Brandenstein | F16H 7/1281 474/112 |
| 5,149,306 A * | 9/1992 | Sidwell | F16H 7/1218 474/117 |
| 5,171,188 A * | 12/1992 | Lardrot | F16H 7/1218 123/90.31 |
| 5,244,438 A * | 9/1993 | Golovatai-Schmidt | F01L 1/02 474/112 |
| 5,246,404 A * | 9/1993 | Ojima | F16H 7/08 474/111 |
| 5,266,067 A * | 11/1993 | Gapco | F16H 7/1281 474/112 |
| RE34,543 E | 2/1994 | Komorowski et al. | |
| 5,354,242 A | 10/1994 | St. John | |
| 5,421,788 A * | 6/1995 | Toth | F16C 13/006 474/135 |
| 5,599,245 A * | 2/1997 | Giese | F16H 7/1218 474/135 |
| 5,620,385 A * | 4/1997 | Cascionale | F16H 7/1218 474/112 |
| 5,759,125 A * | 6/1998 | Berg | F16H 7/1218 474/112 |
| 5,964,674 A * | 10/1999 | Serkh | F16H 7/1218 474/101 |
| 5,967,919 A * | 10/1999 | Bakker | F16H 7/1218 474/115 |
| 6,039,664 A * | 3/2000 | Schmid | F16C 11/04 474/101 |
| 6,165,091 A * | 12/2000 | Dinca | F16F 9/145 474/101 |
| 6,196,940 B1 * | 3/2001 | Lehtovaara | F16H 7/12 474/112 |
| 6,428,435 B1 * | 8/2002 | Kumakura | F16H 7/08 474/111 |
| 6,450,907 B1 * | 9/2002 | Serkh | F16H 7/1236 474/117 |
| 6,524,202 B1 * | 2/2003 | Tada | F16H 7/08 474/109 |
| 6,623,391 B2 * | 9/2003 | Young | F16H 7/08 474/101 |
| 6,932,731 B2 * | 8/2005 | Kaiser | F16H 7/1218 474/112 |
| 7,273,432 B2 * | 9/2007 | Schonmeier | F16H 7/1218 474/112 |
| 7,285,065 B2 * | 10/2007 | Dinca | F16H 7/1281 474/112 |
| 7,588,507 B2 * | 9/2009 | Ayukawa | F16H 7/1218 474/112 |
| 7,637,829 B2 * | 12/2009 | Stone | F16H 7/1281 474/109 |
| 7,686,719 B2 | 3/2010 | Joslyn et al. | |
| 7,837,582 B2 * | 11/2010 | Smith | F16H 7/1281 474/117 |
| 8,057,333 B2 * | 11/2011 | Haesloop | A61K 38/40 474/111 |
| 8,083,623 B2 * | 12/2011 | Cantatore | F16H 7/08 474/109 |
| 8,672,785 B2 * | 3/2014 | Young | F16H 7/08 474/111 |
| 8,690,718 B2 * | 4/2014 | Cantatore | F16H 7/1218 474/101 |
| 2002/0045503 A1 * | 4/2002 | Young | F16H 7/08 474/111 |
| 2002/0142872 A1 * | 10/2002 | Tada | F16H 7/18 474/111 |
| 2002/0160868 A1 * | 10/2002 | Wigsten | F16H 7/0848 474/101 |
| 2004/0005953 A1 * | 1/2004 | Yonezawa | F16H 7/08 474/111 |
| 2008/0058143 A1 * | 3/2008 | Fukuda | F16C 33/02 474/138 |
| 2008/0176687 A1 * | 7/2008 | Scheyer | F16H 7/1281 474/135 |
| 2008/0287233 A1 * | 11/2008 | Cantatore | F16H 7/1218 474/112 |
| 2009/0176609 A1 * | 7/2009 | Lehtovaara | F16D 41/206 474/112 |
| 2010/0113199 A1 * | 5/2010 | Pflug | F16H 7/1218 474/112 |
| 2010/0145559 A1 * | 6/2010 | Gauthier | B60K 6/445 701/22 |
| 2010/0145591 A1 * | 6/2010 | Rolando | F16H 7/18 701/102 |
| 2011/0256969 A1 * | 10/2011 | Frankowski | F16H 7/1218 474/101 |
| 2012/0040789 A1 * | 2/2012 | Cantatore | F16H 7/1218 474/91 |
| 2014/0051533 A1 * | 2/2014 | Yoneda | F16H 7/1218 474/113 |
| 2014/0287859 A1 * | 9/2014 | Frankowski | F02B 67/06 474/135 |

FOREIGN PATENT DOCUMENTS

| | | |
|---|---|---|
| CN | 101755147 A | 6/2007 |
| DE | 3716571 C1 | 1/1989 |
| DE | 102005002253 A1 | 9/2005 |
| DE | 102007015676 A1 | 10/2008 |
| DE | 102007031294 A1 | 1/2009 |
| EP | 450620 A1 | 10/1991 |
| EP | 1368583 B1 | 10/2008 |
| EP | 2239483 B1 | 9/2012 |
| EP | 2464893 B1 | 5/2013 |
| GB | 2328998 A | 3/1999 |
| JP | 60-52433 U | 4/1985 |
| JP | 2004-132390 A | 4/2004 |

(56) References Cited

FOREIGN PATENT DOCUMENTS

| | | |
|---|---|---|
| JP | 2004-204954 A | 7/2004 |
| JP | 2005-511984 T | 4/2005 |
| JP | 2011202778 A | 10/2011 |
| WO | 2001046603 A1 | 6/2001 |
| WO | 2003048606 A1 | 6/2003 |
| WO | 2007066363 A1 | 6/2007 |
| WO | 2008068782 A1 | 6/2008 |
| WO | 2008149389 A1 | 12/2008 |
| WO | 2009106180 A1 | 9/2009 |
| WO | 2011018297 A1 | 2/2011 |
| WO | 2012147957 A1 | 11/2012 |
| WO | 2013059929 A1 | 5/2013 |
| WO | 2013148477 A1 | 10/2013 |
| WO | 2014063228 A1 | 5/2014 |

OTHER PUBLICATIONS

Office Action for CN201380055354 dated Nov. 16, 2016.
Reporting letter for Office Action for CN201380055354 dated Nov. 16, 2016.
English translation of Office Action for CN201380055354 dated Nov. 16, 2016.
International Search Report, PCT/CA/2014000689, dated Sep. 11, 2014.
Automotive Handbook, p. 78, Robert Bosch GmbH/Society of Automotive Engineers, 1986.
Development of Simulation Model for Calculating Loads to Synchronous Drive Belt, Uchida et al. (SAE Paper 930622), Mar. 1, 1993.
European Search Report for EP15164688 dated Oct. 29, 2015.
International Preliminary Report on Patentability for PCT/CA2013/000901 dated Apr. 28, 2015.
International Search Report and Written Opinion for PCT/CA2013/000901 dated Feb. 3, 2014.
Office Action for CN201380055354 dated Jul. 3, 2017.
Office Action for CN201380055354 dated Jul. 3, 2017—English translation.

* cited by examiner

TENSIONER WITH INCREASED DAMPING AND ARM ON BASE CUP CONFIGURATION

CROSS-REFERENCE TO RELATED APPLICATIONS

This application claims priority from U.S. Provisional Patent Application No. 61/876,502 filed Sep. 11, 2013, the contents of which are incorporated herein in their entirety.

FIELD OF INVENTION

This disclosure relates generally to the field of tensioners for endless drive members such as chains or timing belts.

BACKGROUND OF INVENTION

Many engines in vehicles today use a timing belt to drive certain components that require specific synchronization with the rotation of the engine, such as the camshafts which control the opening and closing of the valves to the cylinders. Tensioners used for maintaining tension in the timing belts serve a critical role, since a loss of tension in a timing belt can lead to the timing belt skipping teeth on the toothed pulleys they are connected to. This results in a loss of the synchronization between components such as the valves, with the engine. Such a loss of synchronization can result in catastrophic damage to the engine due to collisions between the valves and the pistons in some engines (those that have an 'interference' design), and can lead to damage even in engines that do not incorporate an 'interference' design.

A tensioner typically includes a base that mounts to the engine, an arm that pivotable relative to the base, and a spring that drives the arm to pivot towards the belt. Damping of the tensioner arm movement has been found to play an important role in order to ensure that the tensioner maintains contact with the belt. Without sufficient damping of the tensioner arm, sudden changes in belt tension can result the arm failing to sufficiently follow the belt, which can lead to the aforementioned loss of belt tension. Ways of achieving suitable damping have been proposed in the past, however, they typically result in an expensive tensioner, which is undesirable. It would be beneficial to provide a tensioner that has sufficient damping, but that remains affordable.

SUMMARY

In a first aspect, a tensioner is provided for maintaining tension in an endless drive member in a belt-in-oil drive system. The tensioner includes a base that is mountable to a stationary structure and that has a circumferential wall that defines an arm pivot axis, an arm having a radially inner arm surface, and an endless drive member engagement surface that is engageable with an endless drive member, a bushing positioned between the radially inner arm surface and the circumferential wall of the base cup, and a tensioning spring. The arm is supported on the base cup via the bushing. The tensioning spring is positioned to bias the arm in a first direction about the arm pivot axis.

In another aspect, a tensioner is provided for maintaining tension in an endless drive member. The tensioner includes a base that is mountable to a stationary structure and that has a circumferential wall that defines an arm pivot axis, an arm having a radially outer arm surface, and a radially inner arm surface that defines a pulley axis that is parallel to and offset from the arm pivot axis, a bushing positioned between the radially inner arm surface and the circumferential wall of the base cup, and a tensioning spring. The arm is supported on the base cup via the bushing. The tensioning spring is positioned to bias the arm in a first direction about the arm pivot axis. The tensioner further includes a pulley having a radially inner pulley wall that is rotatably mounted to the radially inner arm surface for rotation about the pulley axis, and having a radially outer pulley wall that is radially outside the base cup and that is engageable with an endless drive member.

In another aspect, a tensioner is provided for a belt or chain, wherein the tensioner includes a base cup that is stationary relative to the engine; a tensioning spring; an arm rotationally connected with the stationary base cup through the spring; a bearing installed in an aperture in the arm, that is eccentric to a radial center of the arm; a pulley to route the belt or chain being installed and locked with an inner race of the bearing; a bushing placed between OD of the arm and ID of the base cup to provide the thrust surface and frictional torque. A washer may be provided to act as a thrust surface between the arm and the feature (e.g. a feature on the base cup) that encloses the assembly of the arm, bushing, spring and bearing within a chamber in the base cup. The spring resists rotation of the arm/bearing/pulley assembly in a load stop direction and urges rotation of the arm/bearing/pulley assembly in a free arm direction, which is opposite to the load stop direction. The tensioner may include a locking feature that retains the arm/ball bearing/bushing/thrust washer/spring assembly within the inner cylinder of the base cup. The locking feature is fastened to the base cup (pressed-in, staked, welded, etc.). The tensioner configuration is selected in such way that the high peaks of the fluctuating belt load induced by timing drive components are higher than the maximum hysteresis torque of the tensioner and low valleys of the belt load are lower than the minimum hysteresis torque of the tensioner, but the combination of the spring torque, frictional torque of the bushing and washer (in embodiments where the washer is present) and the moment of inertia of the tensioner arm assembly limit the oscillations of the tensioner arm to less than about +/−10° dynamically.

In another aspect, a tensioner is provided as immediately above, but where the pulley and bearing are omitted and the arm itself includes an engagement surface for direct engagement with the belt or chain.

BRIEF DESCRIPTION OF THE DRAWINGS

The foregoing and other aspects of the disclosure will be more readily appreciated by reference to the accompanying drawings, wherein.

DETAILED DESCRIPTION OF ILLUSTRATED EMBODIMENTS

Figure 1:
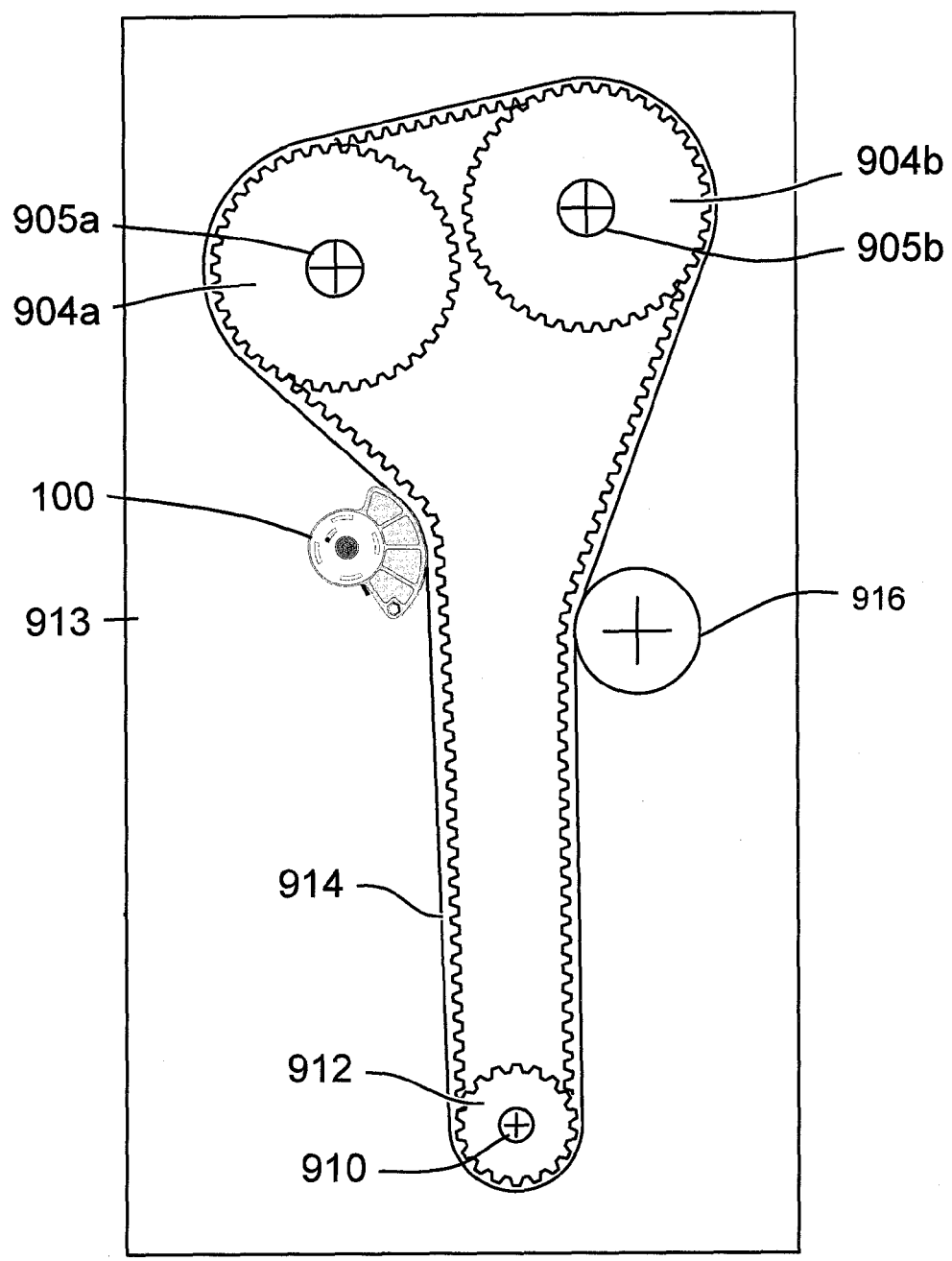
FIG. 1 is an elevation view of an engine with a timing belt drive with a tensioner in accordance with an embodiment of the present invention.

Reference is made to FIG. 1, which shows a crankshaft 910 from an engine 913 from a vehicle (not shown). It will be noted that the engine 913 is shown as a simple rectangle for illustrative purposes. It will be understood that the engine 913 may have any suitable shape. The vehicle may be any suitable vehicle, such as an automobile, a truck, a van, a minivan, a bus, an SUV, a military vehicle, a boat or any other suitable vehicle. A timing belt 914 is shown extending between a pulley 912 on a crankshaft 910 of the engine 913, and a pair of pulleys 904a and 904b on camshafts 905a and 905b, so as to transfer rotary power from the crankshaft 910 to the camshafts 905a and 905b.

A tensioner 100 is shown mounted to the engine 913, between the crankshaft 910 and the camshaft 905a for embodiments in which the timing belt is immersed in an oil bath (referred to as a belt-in-oil arrangement). The tensioner 100 acts to maintain tension in the timing belt 914. An idler is shown at 916 on a span of the timing belt 914 between the camshaft 905b and the crankshaft 910.

Figure 2:
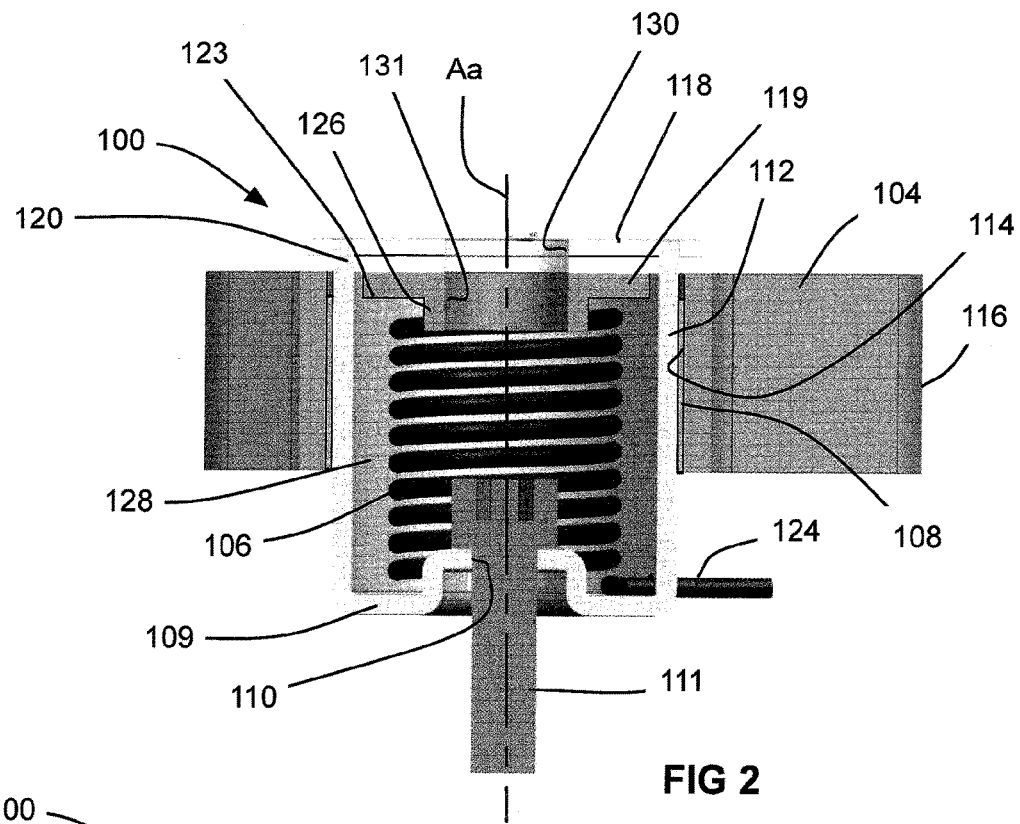
FIG. 2 is a sectional elevation view of tensioner shown in FIG. 1.

With reference to FIG. 2, the tensioner 100 has a base cup 102, a tensioning arm 104, a tensioning spring 106 and a bushing 108. The base cup 102 is mountable by any suitable means to be stationary relative to the engine 913, (e.g. such as by mounting directly to the engine 913). In an example, the base cup 102 may includes a mounting wall 109 that has a fastener pass-through aperture 110 therein that permits the pass-through of a tensioner mounting fastener 111 that holds the base cup 102 fixedly to the engine 913. The base cup 102 further includes a circumferential wall 112 at a radial periphery of the mounting wall 109. The circumferential wall 112 defines an arm pivot axis Aa.

The arm 104 has a radially inner arm surface 114 and an endless drive member engagement surface 116 that is engageable with an endless drive member (e.g. belt 914 shown in FIG. 1, or a chain, or any other suitable endless drive member).

The bushing 108 is positioned between the radially inner arm surface 114 and the circumferential wall 112 of the base cup 102. The arm 104 is supported on the base cup 102 via the bushing 108.

The tensioning spring 106 is positioned to bias the arm 104 in a first direction about the arm pivot axis Aa.

During operation, the belt 914 is driven by the crankshaft pulley 912 in a selected direction (in a generally clockwise direction in the embodiment shown in FIG. 1). The tensioning spring 106 urges the tensioner arm 104 in a first rotational direction, also referred to as a 'free arm' direction, which drives the endless drive member engagement surface 116 into the belt 914.

Damping of this motion is provided by frictional engagement between the bushing 108 and the circumferential wall 112 of the base cup 102. The damping torque provided by the bushing 108 is the damping force (i.e. the friction force, shown at Fd) multiplied by the moment arm of this force (i.e. the radial distance Dd between the direction line of the damping force Fd and the arm pivot axis Aa).

It will be noted that, in some prior art tensioners, the tensioner arm has a hub, and the base cup includes a shaft that extends upwardly. The tensioner arm hub is pivotally supported on the shaft of the base and there is a bushing between them, which provided some amount of damping. The hub, the shaft and the bushing all extend into the interior space in the torsion spring, and the outer wall of the base cup defines a chamber in which the torsion spring is located. The damping force is being applied between the shaft and the hub of the arm, and accordingly, the torque resulting from the damping force is relatively small due to the relative small moment arm associated with it.

By contrast, by using the circumferential wall 112 of the base cup 102 to support the pivotal movement of the arm 104 and by positioning the bushing 108 in association with the circumferential wall 112, the damping torque that is achieved may be larger than that achieved in prior art tensioners without significantly increasing the overall footprint of the tensioner as compared to said prior art tensioners. In the embodiment shown, the bushing 108 is on the outside of the circumferential wall 112 which provides even greater torque than if it were on the inside of the wall 112.

In general, with any tensioner, a long arm length (defined as the distance between the belt engagement surface and the arm pivot axis) increases the torque exerted on the arm by the belt. However, a problem with some tensioners of the prior art is that it is difficult to generate the amount of damping that is needed to properly control the tensioner's movements as the belt tension changes. If there is not enough damping, the tensioner arm may not be able to sufficiently follow the belt during decreases in belt tension, leading to a sufficient loss of belt tension that tooth skip becomes a risk, which can lead to serious damage of the engine. In order to ensure that there is sufficient damping relative to the amount of the torque acting on the arm from the belt, some tensioner manufacturers have resorted to keeping the arm length relatively small. This restricts the amount of torque applied by the belt to the arm, by keeping the arm length (and therefore the moment arm that contributes to the torque) small. However having a small arm length is disadvantageous in that it implicitly means that a larger angular range of movement of the arm is needed to accommodate a selected amount of movement in the belt. The greater the angular range of movement of the arm during operation, the greater the change in the geometry of the forces acting on the belt through the tensioner, which renders it more difficult for the tensioner to approximate an ideal response to changes in belt tension.

The base 102 may include a cover member 118 that covers the open, distal end (shown at 120) of the base cup 102 so as to inhibit dust and debris from migrating into the tensioner 100.

Figure 3:
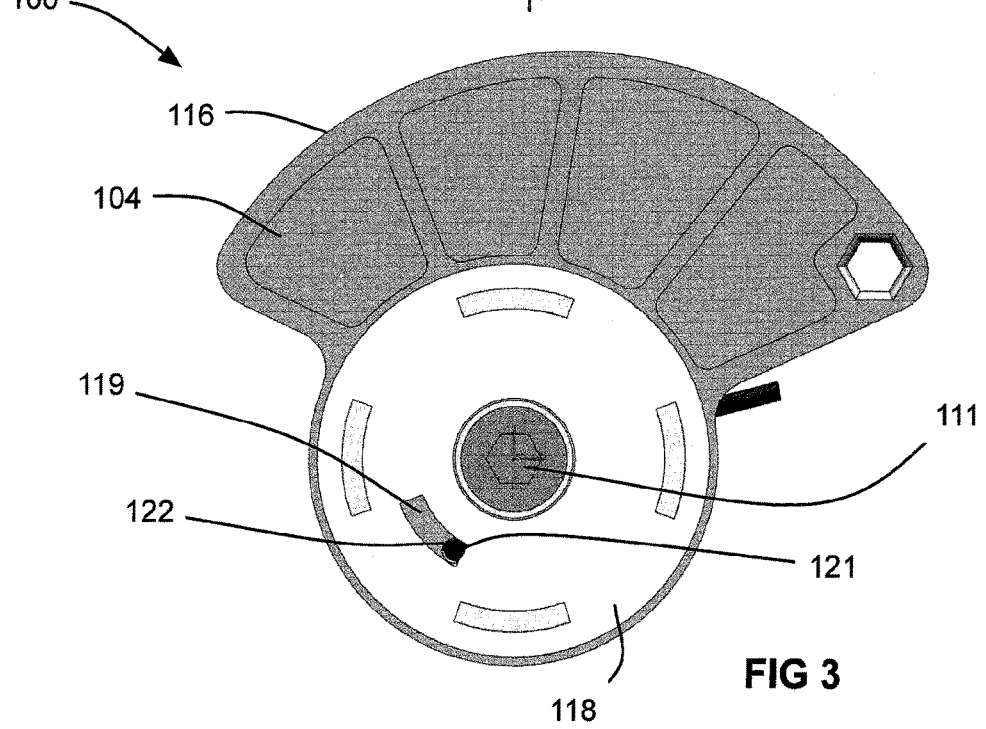
FIG. 3 is a plan view of the tensioner shown in FIG. 2.

The arm 104 may have a central portion 119 that rests on a shoulder 123 on the base 102 to support the arm 104 axially and to set the axial position of the arm 104. The central portion 119 has an aperture 121 (see FIG. 3) therein for receiving one end shown at 122 of the helical torsion spring 106. The other end (shown at 124) of the spring 106 may extend through an aperture in the circumferential wall 112 of the base cup 102. A spring guide wall 126 may extend into the chamber shown at 128 that is defined by the base cup 102. A fastener access aperture 130 in the cover member 118 and an aperture 131 in the central portion 119 of the arm 104 permits access to the mounting fastener 111 for mounting and removal of the tensioner 100.

Advantageously, with the arrangement shown, it will be seen that the damping torque that is provided by the tensioner 100 is dependent on the hub load acting on the arm 104. This is because the friction force exerted between the arm 104, the circumferential wall 112 and the bushing 108 depends on the normal force between them, which varies with the hub load.

Figure 4:
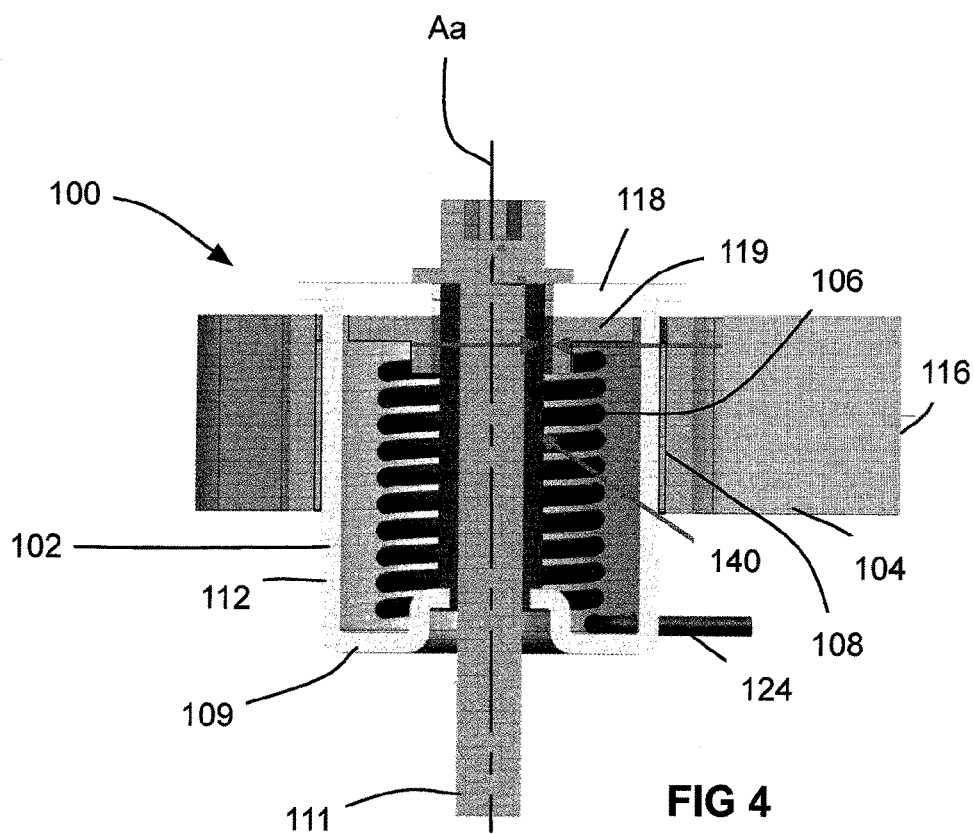
FIG. 4 is a sectional elevation view of another variant of the tensioner shown in FIG. 2.

FIG. 4 shows another embodiment of the tensioner 100. In this embodiment, a shaft shown at 140 is provided as part of the base cup 102. The shaft 140 extends upwards through the apertures 130 and 131 in the cover member 118 of the base 102 and central portion 119 of the arm 104. The mounting fastener 111 shown here is easily accessible from outside the tensioner 100 so as to facilitate mounting and removal of the tensioner 100. It will be noted that there is a gap shown between the spring guide wall 126 and the shaft 140 so as to highlight that, in the embodiment shown, there is no frictional engagement between the arm 104 and the shaft 140, so as to emphasize a distinctive feature of the tensioner 100 over the prior art.

Figure 5:
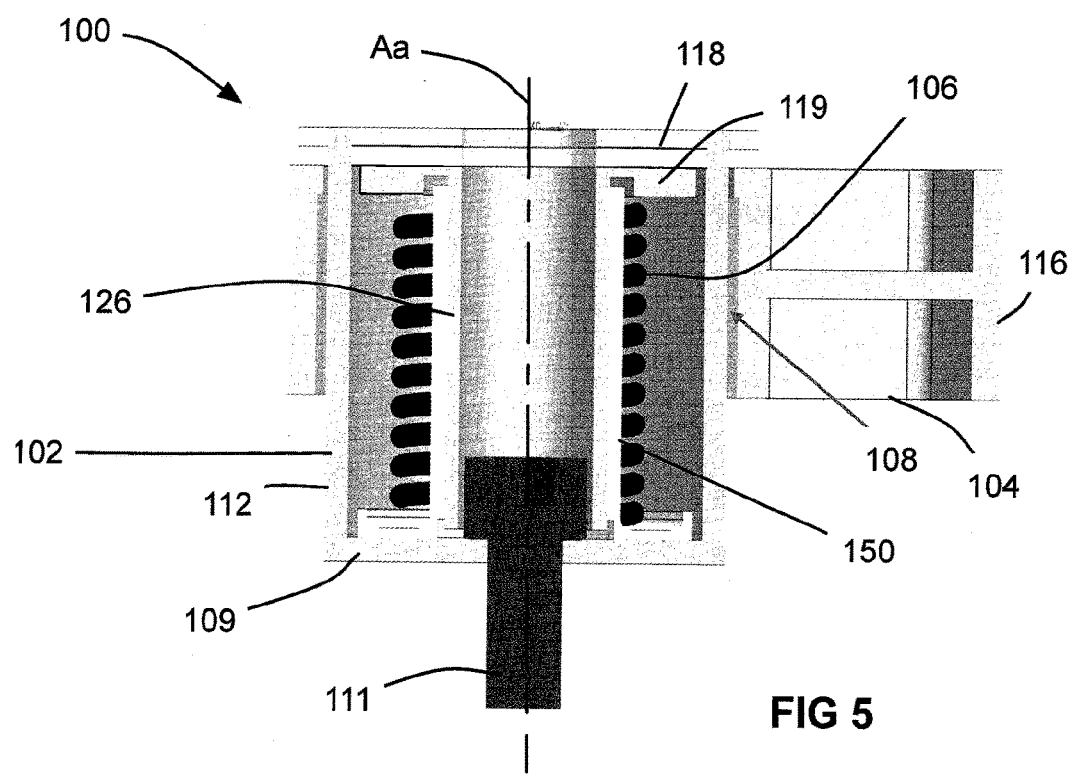
FIG. 5 is a sectional elevation view of yet another variant of the tensioner shown in FIG. 2.

FIG. 5 shows another embodiment of the tensioner 100, in which the spring guide wall 126 extends substantially along the entire axial length of the chamber 128, and a spring support 150 is provided around the guide wall 126. The spring 106, during operation, will engage the spring support 150 in similar manner to the engagement between the spring and spring support shown in FIGS. 5 and 11 of PCT publication WO2014063228A1 thereby providing additional damping to the damping provided at the bushing 108.

Figure 6:
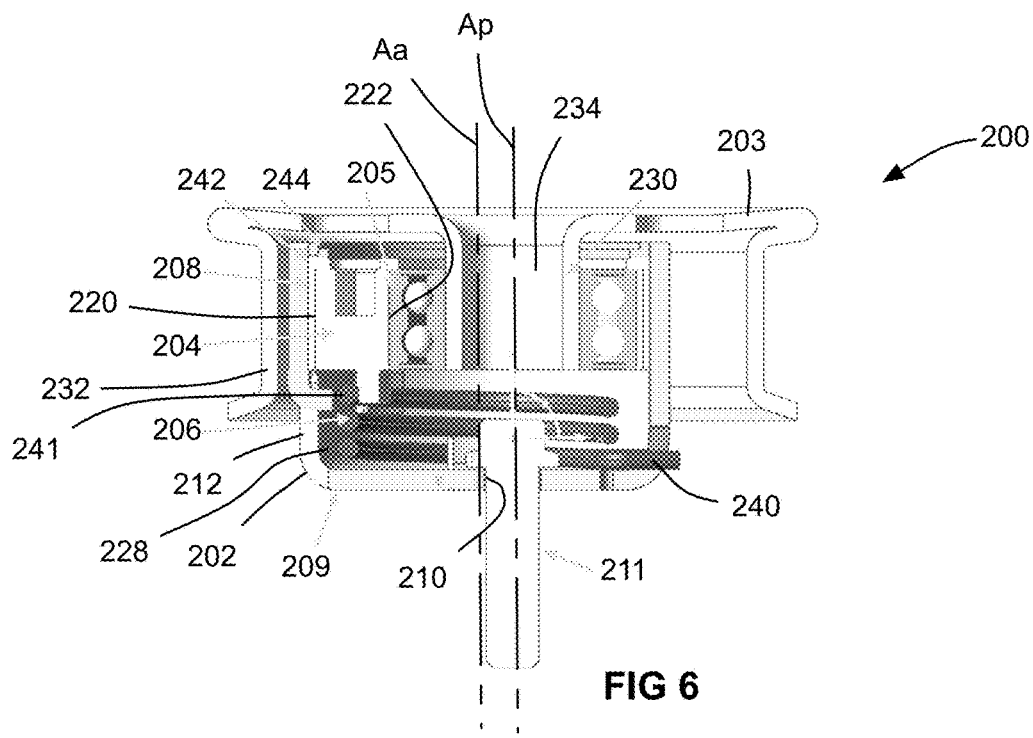
FIG. 6 is a sectional elevation view of an engine with a timing belt drive with a tensioner in accordance with another embodiment of the present invention.

Reference is made to FIG. 6, which shows a tensioner 200 in accordance with another embodiment of the present invention. The tensioner 200 is configured for use with belts that are not immersed in oil, (i.e. dry belt environments). The tensioner 200 includes a base 202, a tensioning arm 204, a tensioning spring 206, a bushing 208, a pulley 203, and a bearing 205. A difference between the tensioner 200 and the tensioner 100 is that the tensioner 200 includes a pulley and bearing to permit rotation of the pulley relative to the arm, which is not necessary with the tensioner 100 due to the belt-in-oil environment it is used in.

Figure 7:
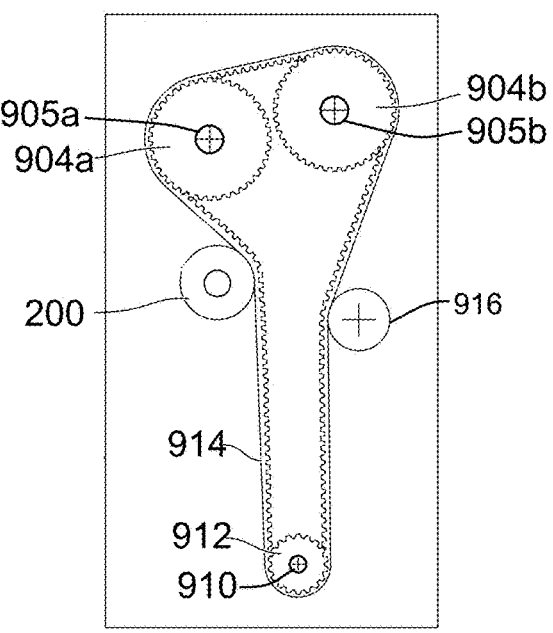
FIG. 7 is an elevation view of an engine with a timing belt drive with the tensioner shown in FIG. 6.

The base 202 may be similar to the base 102, and may be in the form of a base cup that includes a mounting wall 209 that has a fastener pass-through aperture 210 therein that permits the pass-through of a tensioner mounting fastener 211 that holds the base cup 202 fixedly to the engine 913 (FIG. 7), and a circumferential wall 212 at a radial periphery of the mounting wall 209. The circumferential wall 212 defines arm pivot axis Aa.

The arm 204 has a radially outer arm surface 220, and a radially inner arm surface 222 that defines a pulley axis Ap that is parallel to and offset from the arm pivot axis Aa. The bushing 208 is positioned between the radially outer arm surface 220 and the circumferential wall 212 of the base 202. The arm 204 is supported in the base 202 via the bushing 208. The pulley 203 has a radially inner pulley wall 230 that is rotatably mounted to the radially inner arm surface 222 for rotation about the pulley axis Ap, and has a radially outer pulley wall 232 that is radially outside of the base 202 and that is engageable with an endless drive member (e.g. belt 914 shown in FIG. 7). The bearing 205 is positioned between the radially inner arm surface 222 and the radially inner pulley wall 230.

The tensioning spring 206 is positioned to bias the arm 204 in a first direction (i.e. referred to as a free arm direction) about the arm pivot axis Aa so as to drive the pulley 203 into the belt 914. In the embodiment shown, the tensioning spring 206 is positioned in the base 202, in the chamber shown at 228 formed therein. The tensioning spring 206 may be a helical torsion spring, similar to the spring 106. A first helical end 240 of the spring 206 engages the base 202, while a second end 241 of the spring 206 engages the arm 204.

In the embodiment shown in FIG. 6, the radially inner pulley wall 230 defines an axially extending fastener access aperture 234 that provides access for installing and removing the fastener 211. As can be seen in FIG. 6, the eccentricity of the arm 204 may cause the fastener access aperture 234 to be axially offset from the fastener 211 in most arm positions. Thus, some movement of the arm 204 may be needed to align them sufficiently to provide easy access.

The bushing 208 in the embodiment shown in FIG. 6 again acts to generate friction at the circumferential wall 212 of the base 202, and outside of the diameter of the spring 206 thereby generating a large damping torque as compared to the damping torque provided in some prior art tensioners where the frictional damping is provided between a hub of the arm and a shaft inside the base cup.

A thrust member shown at 242 is provided at a distal end of the arm 204 and prevents metal-to-metal contact between the arm 206 and the base 202 during operation of the tensioner 200. A locking ring 244 is provided to hold the thrust washer 242 in place.

Figure 8:
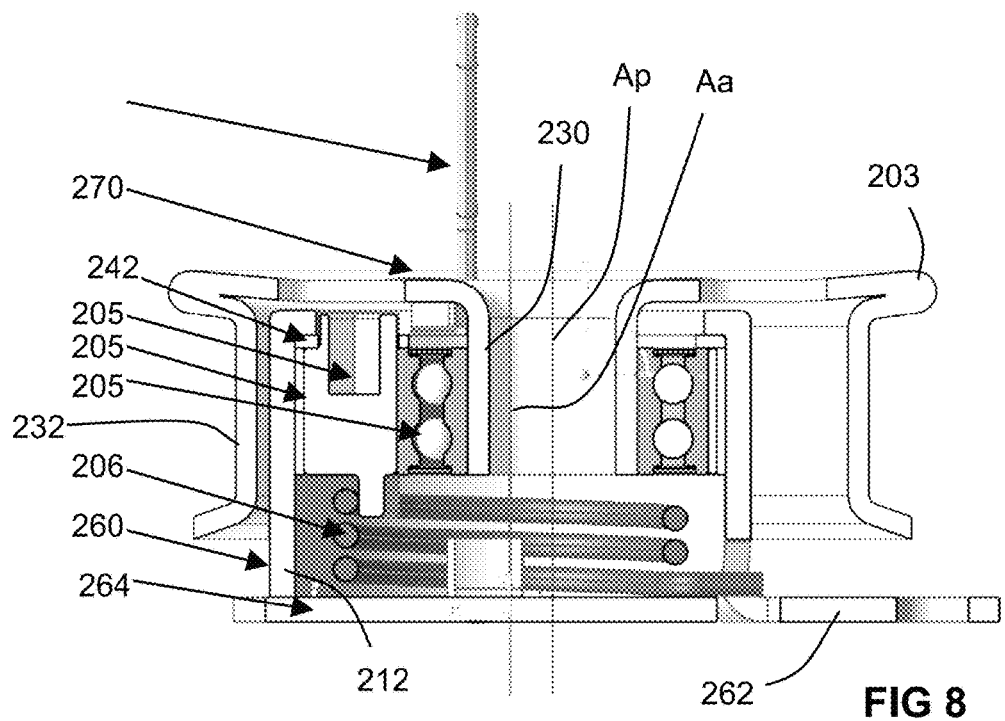
FIG. 8 is a sectional elevation view of a variant of the tensioner shown in FIG. 6.

FIG. 8 shows another embodiment of the tensioner 200, in which the base 202 includes a cup shown at 260 that faces with its mouth towards the engine 913 and that includes arms 262 (FIG. 9) which have apertures for mounting the base 202 to the engine 913. The base 202 further includes a locking ring 264 that is at the opposite axial end of the base 202 to the locking ring 244 shown in FIG. 6. The locking ring 264 holds the spring 206 in the chamber in the base 202. A thrust member 242 is again provided at a distal end of the arm 204 however, to prevent metal-to-metal contact between the arm 206 and the base 202.

Figure 9:
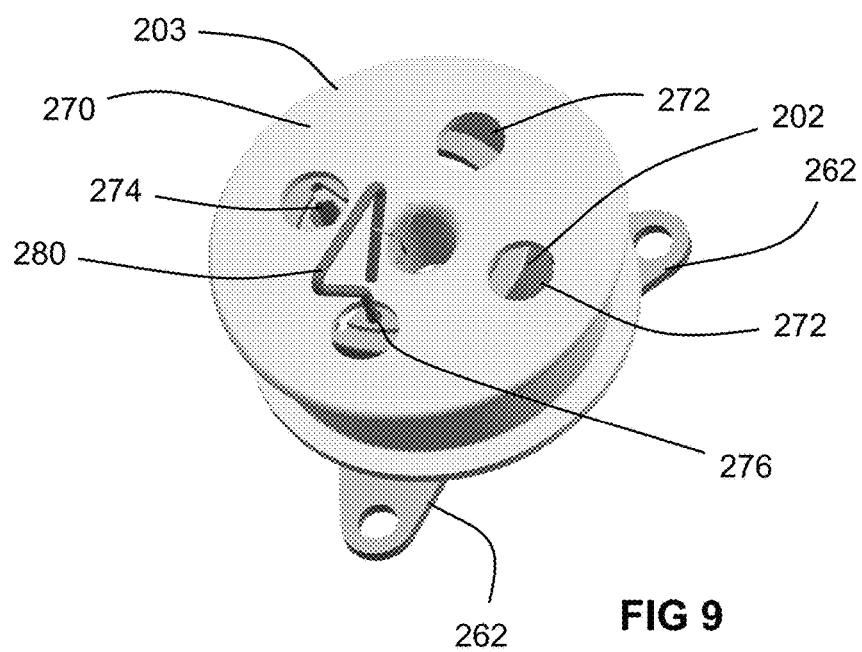
FIG. 9 is a perspective view of the tensioner shown in FIG. 8.

In the embodiment shown in FIG. 8, the pulley 203 includes an axial end wall 270 extending between the radially inner and radially outer pulley walls 230 and 232, and at least one axial end wall aperture. In the example shown the pulley 203 has four axial end wall apertures shown at 272 as can be seen in FIG. 9. The pulley 203 is rotatable to an installation position in which the at least one axial end wall aperture 272 is aligned with a tool engagement feature 274 (such as a hex-shaped aperture for receiving an Allen key) of the arm 204 and with a first locking pin receiving aperture 276 on the base 202 which is aligned with a second locking pin receiving aperture 278 on the arm 204. A locking pin 280 is insertable through the at least one axial end wall aperture 272, through one of the first and second locking pin receiving apertures 276 and into the other of the first and second locking pin receiving apertures 278 so as to lock the arm 204 and the base 202 in a selected angular position relative to one another.

Figure 10:
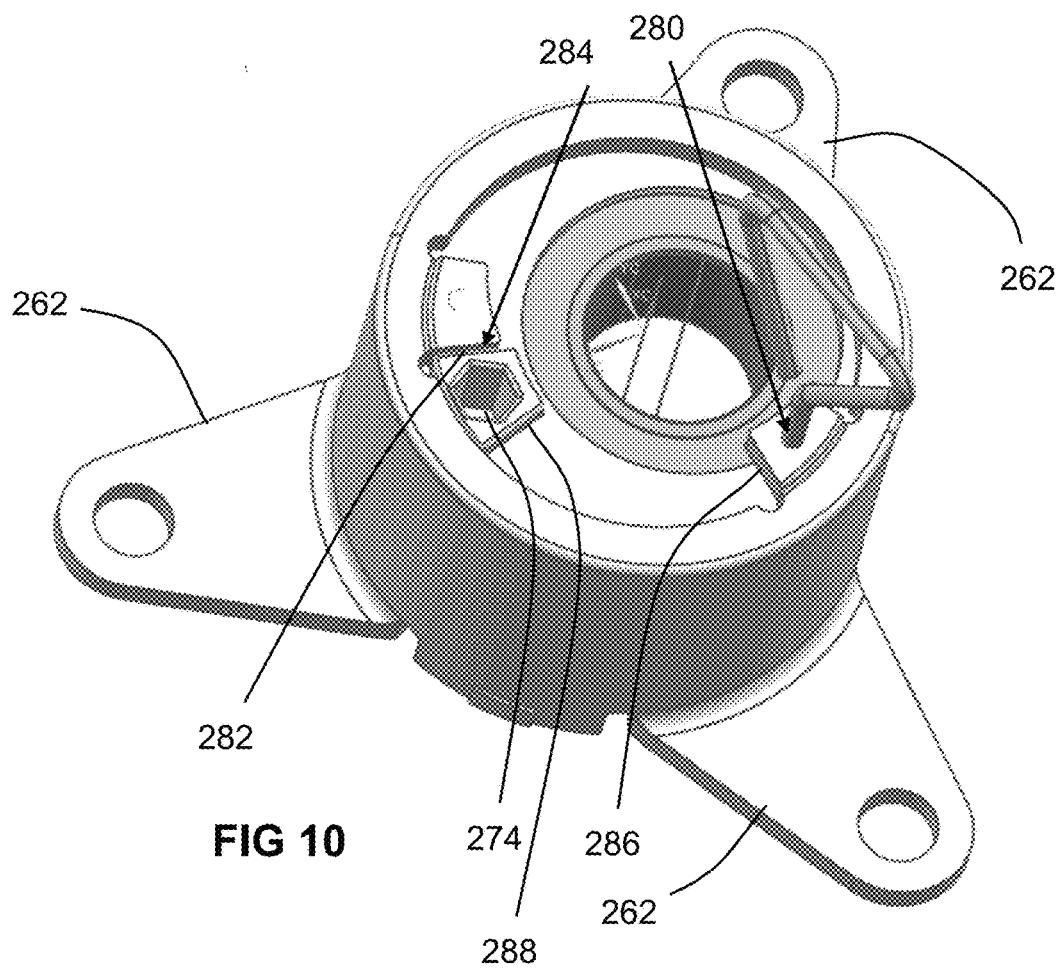
FIG. 10 is another perspective view of the tensioner shown in FIG. 8, without a pulley.
Figure 12:
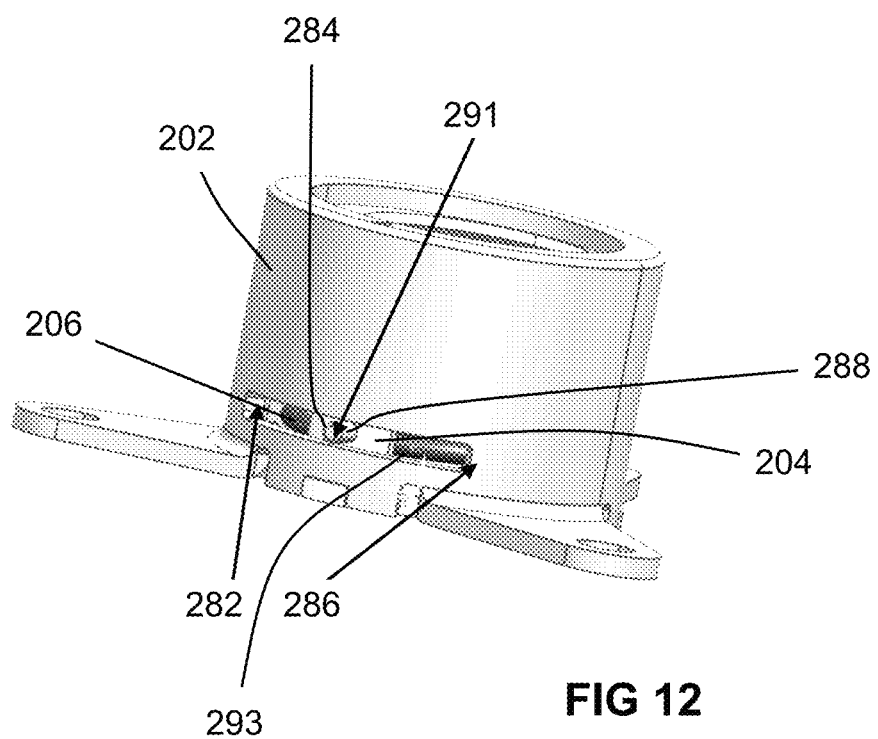
FIG. 12 is a perspective view of a variant of the tensioner shown in FIG. 8.

FIG. 10 shows the tensioner without selected components such as the pulley. As shown in FIG. 10, there are first and second load stop limit surfaces 282 and 284 on the base 202 and the arm 204 respectively that cooperate to define a load-stop position for the tensioner 200, which is the position of maximum permissible pivoting of the arm resulting from high tension in the belt 914. There are first and second free-arm limit surfaces 286 and 288 on the base 202 and the arm 204 respectively that cooperate to define a free-arm position for the tensioner 200, which is the position of maximum permissible pivoting of the arm 204 resulting from the biasing force from the spring 206. An alternative construction for the limit surfaces 282, 284, 286 and 288 is shown in FIG. 12. In this embodiment, a pin 291 that is pressed into a tongue extending axially from the arm 204 has the limit surfaces 284 and 288 on it. The pin 291 extends through a slot 293 on the base 202, the ends of which act as the limit surfaces 282 and 286.

As shown in FIG. 10, when the locking pin 280 (which may also be called an installation pin) is installed, the tensioner arm 204 is at the load stop position, which keeps the arm 204 out of the way when installing the tensioner 200 on an engine in which the belt 914 is already installed.

Figure 11:
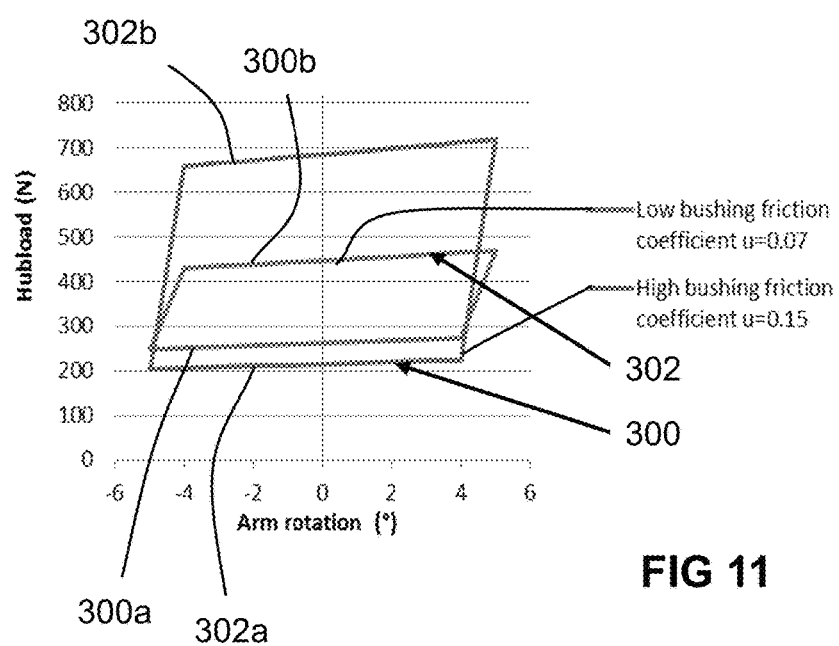
FIG. 11 is a graph illustrating the relationship between the torque applied by the tensioner and the angular position of the tensioner arm.

FIG. 11 shows two hysteresis curves 300 and 302 which represent examples of the torque applied to the tensioner arm 204 that drives the pulley 203 into the belt 914. The curve 300 represents the torque on the arm 204 when the coefficient of friction at the bushing 208 is 0.07, while the curve 302 represents the torque on the arm 204 when the coefficient of friction at the bushing 208 is 0.15. As will be understood, the upper portions (shown at 300a and 302a) of the curves 300 and 302 represent the tensioner arm torque when the tensioner arm 204 is moving towards the load stop position. The lower portions (shown at 300b and 302b) represent the tensioner arm torque when the tensioner arm 204 is moving towards the free-arm stop position.

These hysteresis curves 300 and 302 illustrate that, when the coefficient of friction increases by a factor of about 2, the tensioner arm torque remains relatively stable during movement of the arm 204 in the free-arm direction, while the torque increases by about 50% during movement of the arm 204 in the load-stop direction. This is beneficial because in situations where the coefficient of friction is higher than that which was originally conceived for the tensioner 200, the lower portion of the tensioner arm torque curve remains stable. By contrast, in some tensioners of the prior art such as some tensioners that use the spring to exert a force on a friction member that contributes to the damping torque, a change in the friction coefficient can result in a large increase in the upper portion of the torque curve but also a large decrease in the lower portion of the torque curve.

Thus it can be seen that the minimum torque applied by the arm 204 remains relatively stable even under large changes in the coefficient of friction at the damping member (i.e. at the bushing 208), and the same is true for the minimum torque applied by the arm 104 under large changes in the coefficient of friction at the damping member 108. Furthermore, it can be seen that the amount of damping in the tensioners 100 and 200 is based on the hub load, as described above. As a result, during moments where the hub load is decreasing, the damping torque drops, which facilitates the work of the spring 206 (and 106) to drive the arm 204 (or 104) into the belt 914.

By ensuring that under many conditions the minimum torque applied by the arm 904 remains relatively stable, the risk of suffering from the 'rope-tow' effect is reduced, which in turn means that there is less risk of the tension in the belt 914 dropping to zero which can lead to tooth skip and subsequent damage to the belt and the engine 913.

It will be noted that there are several advantages to the tensioner configuration shown in FIGS. 6-10. For example, by having the arm 204 outside of the bearing 205 and by turning the pulley 203 on the inside of the bearing 205, there is significantly less wear that occurs on the bearing because the rolling elements of the bearing (e.g. balls) will be rolling at a lower velocity than they would if the pulley 203 were on the outside. This lower velocity also contributes to less heat than would exist with opposite configuration, which further contributes to an extended operating life for the bearing.

It will be noted that, even though the arm 204 is outside of the bearing 205, the arm 204 is still relatively lightweight and occupies relatively little space axially. This is partly achieved because the arm 204 itself is generally ring-shaped, or annular, albeit with an eccentricity between its inner surface 222 and its outer surface 220. By contrast, the arms of some prior art tensioners can be quite heavy, thereby increasing their inertia and reducing their responsiveness to changes in belt tension. This low weight assists the arm 204 in being responsive to changes in belt tension.

The configuration of the arm 204, the pulley 203, and the base 202 contribute to a relatively low axial height for the tensioner 200. It has been found that, sizing the chamber 228 to provide 6.5 mm of room for the spring 206, and using an 8 mm wide 6003 ball bearing, the entire tensioner 200 can have an axial height of about 21.5 mm, and may have an eccentric (i.e. the distance between the pulley axis Ap and the arm pivot axis Ap) of 3 mm in some embodiments, or 5 mm or more in other embodiments. The damping torque generated at the bushing 208 may be sufficient to support an eccentric of 25 mm in some cases.

By providing the higher damping torque, the arm length of the tensioner arm 104 or 204 may be large as compared to prior art tensioner arms, resulting in a relatively smaller angular movement that the arm 104 or 204 extends through to accommodate a selected set of belt tension conditions. The smaller angular movement of the arm 204 permits a 'flatter' (i.e. less parabolic) torque curve for the spring 206, which means a generally more constant belt tension during operation of the engine 913. The high peaks of the belt load, which are induced by components engaged with the belt such as the crankshaft pulley 912, are higher than the maximum torque on whichever hysteresis curve is applicable for the tensioner 200 (e.g. curve 300), and the low valleys of the belt load are lower than the minimum torque on the applicable hysteresis curve, so as to induce movement of the arm 204. During operation of the engine 913, torques that are outside of the hysteresis curve of the tensioner 200 induce movement in the tensioner arm 204. The combination of the spring torque and the frictional torque (from the bushing 208 and any other frictional elements, such as, the thrust member 242) and the inertia in the arm 204 and arm-mounted components such as the pulley 203 and bearing 205 if present limit the oscillations of the arm 204 to less than a selected value, such as, for example, +/−10 degrees dynamically. In some embodiments, the selected value may be +/−2 degrees dynamically, This advantageously contributes to the aforementioned flatter torque curve for the spring 206.

In general, in the embodiments described herein, the tensioner arm 104, or 204, may be made from steel or from aluminum. The base 102 or 202 may be made from steel or aluminum. The bushing 108 or 208 may be made from nylon or from a material incorporating PTFE or from PTFE itself, depending on the amount of damping and wear resistance needed.

In general where the bushing is provided between the arm and a base to provide damping, the bushing may be locked rotationally with the arm so that friction is generated with the base, it may be locked to the base so that friction is generated with the arm, or it may be not locked to either, thereby potentially generating friction with either or both of the arm and the base. The frictional damping force is nonetheless generally at the circumferential wall of the base in each case.

As can be seen, the tensioner 200 can be operated without a spring support, without a pivot shaft, and without an installation shaft (a shaft that is used to adjust a starting position of the arm in relation to the base), all of which can be relatively expensive components to manufacture, thereby reducing the cost of manufacture of the tensioner 200. Furthermore, a large amount of damping is provided even when the diameter of the bearing 205 remains small. The advantages that are not related to the bearing also apply to the tensioner 100.

In general, where reference is made herein to the pulley 203, it will be noted that the term 'pulley' is intended to be interpreted broadly to include rotating elements with or without teeth and which are configured to engage the smooth side of a toothed belt, the toothed side of a toothed belt, or to engage a chain. The engagement between a pulley with a belt or a chain may be either synchronous (i.e. where teeth on the pulley mesh with teeth on the belt or with apertures in the chain) or asynchronously the pulley has a smooth engagement surface for engagement with the either side of the belt or with the chain.

Those skilled in the art will understand that a variety of modifications may be effected to the embodiments described herein without departing from the scope of the appended claims.

The invention claimed is:

1. A tensioner for maintaining tension in an endless drive member in a belt-in-oil drive system, comprising:
   a base that is mountable to be stationary relative to the engine, and that has a circumferential wall that defines an arm pivot axis;
   an arm having a radially inner arm surface, and an endless drive member engagement surface that is engageable with an endless drive member;
   a bushing positioned between the radially inner arm surface and the circumferential wall of the base, wherein the arm is supported on the base via the bushing; and
   a tensioning spring that is positioned to bias the arm in a first direction about the arm pivot axis,
   wherein the base has a mounting wall at one axial end of the base, wherein the mounting wall has a fastener pass-through aperture for receiving a mounting fastener, and wherein the tensioner further includes a cover member that covers an open end of the base that is at another end axially opposite the mounting wall of the base, and has an axially extending fastener access aperture that provides access to the fastener pass-through aperture.

2. A tensioner as claimed in claim 1, wherein the tensioning spring is a helical torsion spring.

3. A tensioner as claimed in claim 1, wherein the bushing provides a damping torque that is dependent on a force applied to the arm against by the endless drive member.

4. A tensioner as claimed in claim 1, wherein the damping torque provided by the arm is such that an increase in a coefficient of friction at the bushing results in a less-than 25 percent drop in a minimum torque applied by the tensioner arm on the endless drive member during operation.

* * * * *

UNITED STATES PATENT AND TRADEMARK OFFICE
CERTIFICATE OF CORRECTION

PATENT NO. : 9,869,379 B2
APPLICATION NO. : 14/917743
DATED : January 16, 2018
INVENTOR(S) : Marek Frankowski It is certified that error appears in the above-identified patent and that said Letters Patent is hereby corrected as shown below:

In the Claims

At Column 10, Lines 21-23, delete Claim 3 and insert the following:
--3. A tensioner as claimed in claim 1, wherein the bushing provides a damping torque that is dependent on a force applied to the arm by the endless drive member.--

Signed and Sealed this
Tenth Day of April, 2018

Andrei Iancu
*Director of the United States Patent and Trademark Office*